United States Patent [19]

Iizuka et al.

[11] 4,061,055

[45] Dec. 6, 1977

[54] FUEL INJECTION CONTROL SYSTEM FOR AN INTERNAL COMBUSTION ENGINE OF A VEHICLE

[75] Inventors: Haruhiko Iizuka; Junichiro Matsumoto, both of Yokosuka; Fumiaki Kato, Yokohama, all of Japan

[73] Assignee: Nissan Motor Co., Ltd., Yokohama, Japan

[21] Appl. No.: 718,189

[22] Filed: Aug. 27, 1976

[30] Foreign Application Priority Data

Aug. 28, 1975 Japan ................................ 50-103474

[51] Int. Cl.2 ........................ B60K 41/18; F02B 3/00; F02B 77/00

[52] U.S. Cl. .................................. 74/866; 123/198 F; 123/32 EA; 74/859

[58] Field of Search ...................... 123/198 F, 32 EA; 74/857, 858, 859, 860, 866

[56] References Cited

U.S. PATENT DOCUMENTS

| | | | |
|---|---|---|---|
| 2,875,742 | 3/1959 | Dolza | 123/198 F X |
| 3,578,116 | 5/1971 | Nakajima et al. | 123/198 F X |
| 3,741,042 | 6/1973 | Ravenel | 74/866 X |
| 3,756,205 | 9/1973 | Frost | 123/198 F X |
| 3,763,720 | 10/1973 | Aono et al. | 74/866 X |
| 3,939,738 | 2/1976 | Adey et al. | 74/866 X |
| 4,008,567 | 2/1977 | Hirsch | 74/866 X |

*Primary Examiner*—Samuel Scott

*Assistant Examiner*—Lance W. Chandler

[57] ABSTRACT

A control system which controls the number of fuel-injected cylinders is used with an electronic type of automatic transmission system and includes compensating means or an engine operating parameter changing unit for changing a parameter fed to the transmission system to properly operate the same, thus increasing fuel economy or reducing fuel consumption.

10 Claims, 2 Drawing Figures

FUEL INJECTION CONTROL SYSTEM FOR AN INTERNAL COMBUSTION ENGINE OF A VEHICLE

This invention relates in general to a fuel injection control system for an internal combustion engine of a vehicle, and particularly to a fuel injection control system controlling the number of cylinders to which fuel is injected, and more particularly to such a fuel injection control system for use with a conventional electronic type of automatic transmission system.

Certain electronic types of automatic transmission systems have been proposed which are disclosed for example in U.S. Pat. Nos. 2,995,949 and 3,052,134. However, when these conventional automatic transmission systems are employed together with a fuel injection control system for controlling the number of cylinders to which fuel is injected, the following disadvantage can be pointed out. That is, when employing such a fuel injection control system, the number of the cylinders to which fuel is injected is determined such that manifold absolute pressure becomes generally within the range from 100 to 150 mmHg in order to attain fuel economy or decrease fuel consumption. Therefore, the opening degree of a throttle is adjusted to maintain the above described manifold absolute pressure. On the other hand, the shifting of gear ratios in the automatic transmission system is determined depending upon vehicle velocity and also a suitable engine operating parameter. However, when the fuel injection control system is employed together with the automatic transmission system, the opening degree of the throttle or the manifold absolute pressure is used as the engine operating parameter. In this instance, however, the opening degree of the throttle or the manifold absolute pressure is not preferable because it is no longer a proper parameter for controlling the shifting of gear ratios. This is because the opening degree of the throttle is always controlled to maintain the manifold absolute pressure within the above described range. Therefore, if the opening degree of the throttle or the manifold absolute pressure is used as a parameter without any compensation, a gear ratio change is liable to take a lower position than intended. For example, even if a second gear ratio is desirable from a viewpoint of fuel economy, gears are shifted into the first gear ratio for reducing engine torque. This contravenes the concept of the aforementioned fuel injection control system, reducing the fuel conomy.

The present invention therefore contemplates an improved fuel injection control system, which controls the number of cylinders to which fuel is injected, in order to remove the above described defect.

In accordance with the present invention, an improved fuel injection control system for use with an electronic type of automatic transmission system for an internal combustion engine of a vehicle comprises in combination: a plurality of injection means respectively provided at corresponding cylinders of the engine; a first sensor for sensing the opening degree of a throttle or a manifold absolute pressure to generate a signal representative thereof; a second sensor for sensing vehicle velocity to generate a signal representative thereof, which second sensor is connected to a transmission control unit of the automatic transmission system to supply the same with the signal; a control unit connected to said first and said second sensor receiving the signals therefrom for determining the number of cylinders to which fuel is injected, and controlling the plurality of injection means connected thereto; and compensating means connected to the first sensor for receiving the signal therefrom and also connected to the control unit of the fuel injection control system for receiving a signal representative of the number of the cylinders to which fuel is injected, and generating a signal representative of the opening degree of the throttle under the condition that fuel is injected to all of the cylinders, regardless of the cylinders to which fuel is actually injected, said compensating means being connected to the transmission control unit for supplying the same with the signal therefrom, whereby the transmission control unit determines a proper shifting of gear ratios based on the signals from both the compensating means and from the second sensor.

It is therefore an object of the present invention to remove the above described defect by providing an improved compensating means in order to properly control a control unit of an automatic transmission system of an electronic type, which transmission system is used with a fuel injection control system for controlling the number of cylinders to which fuel is injected.

This and other objects, features and many of the attendant advantages of this invention will be appreciated more readily as it becomes better understood by reference to the following detailed description, when considered in connection with the accompanying drawings, wherein like parts in each of the several figures are identified by the same reference characters, and wherein.

Figure 1:
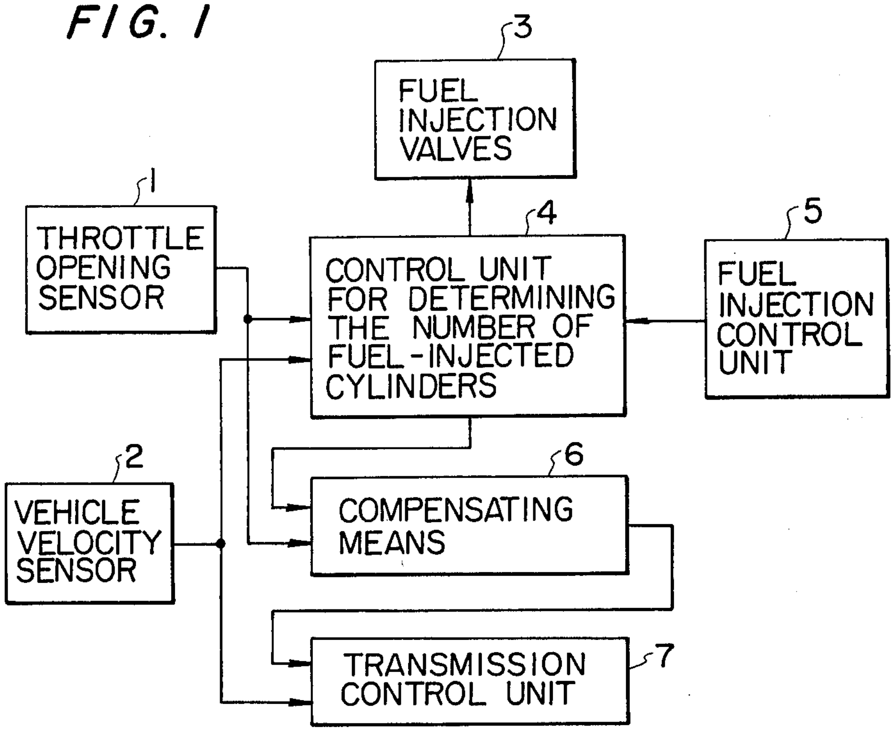
FIG. 1 is a schematic diagram of the present invention.

Reference is now made to the accompanying drawings, first to FIG. 1, which illustrates a schematic block diagram of a preferred embodiment of the present invention. A fuel injection control unit 5 feeds a control signal to a control unit 4, which control signal represents an optimum quantity of fuel to effectively operate an internal combustion engine (not shown) of a vehicle. In the followings, detailed description of the fuel injection control unit 5 will be omitted because the present invention is not concerned therewith. The control unit 4 determines the number of cylinders to which fuel is injected, and controls fuel injection through a plurality of fuel injection valves 3 which are respectively positioned on the cylinders. The determination of the number of the cylinders to which fuel is injected is performed based on signals from a throttle opening sensor 1 and a vehicle velocity sensor 2. The throttle opening sensor 1 is connected to the control unit 4 and converts the opening degree of the throttle into a proportional electrical signal. As to the vehicle velocity sensor 2, which is also connected to the control unit 4, a conventional speedometer is available. With this arrangement, when the signal from the vehicle velocity sensor 2 exceeds a predetermined level and at the same time the signal from the throttle opening sensor 1 falls below another predetermined level, the control unit 4 determines the number of cylinders to which fuel is actually injected based on the two signals applied and stops injection of fuel to specified one or more cylinders. Under this circumstance, in order to maintain the original engine operating condition, the vehicle driver should depress the accelerator pedal (not shown) more to open the throttle more. Therefore, the opening degree of the throttle is changed to a desirable value where fuel consumption is desirably decreased and the engine is running efficiently.

An engine operating parameter changing unit or compensating means 6 receives the signal from the throttle opening sensor 1 and also the signal from the control unit 4. The signal from the control unit 4 represents the number of the cylinders to which fuel is not injected. Then, the compensating means 6 feeds an electrical signal to a transmission control unit 7. The signal from the compensating means 6 represents the opening degree of the throttle when fuel is injected to all of the cylinders, regardless of the number of the cylinders to which fuel is actually injected. This means that the transmission control unit 7 is not affected by the provision of the control unit 4 which controls the number of fuel-injected cylinders for maintaining the manifold absolute pressure within the range from 100 to 150 mmHg as previously referred to. Thus, the transmission control unit 7 can properly cntrol the automatic shifting of gear ratios in the transmission.

In the above, the signal from the control unit 4 can be changed to represent the number of the cylinders to which fuel is actually injected, and the throttle opening sensor 1 can be replaced by a sensor for sensing a manifold absolute pressure.

Figure 2:
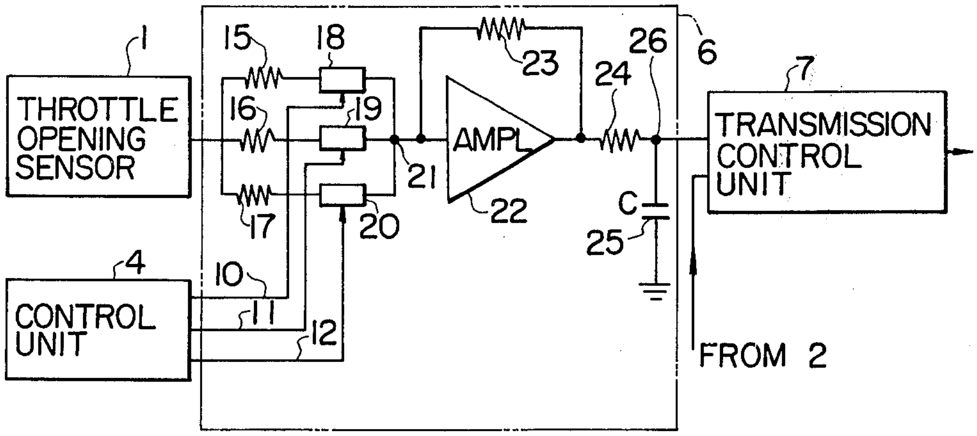
FIG. 2 is a detailed illustration of a unit in FIG. 1 in conjunction with its pheripheral units for better understanding of the present invention.

FIG. 2 illustrates a detailed circuit of the engine operating parameter changing unit or the compensating means 6 together with its peripheral units 1, 4 and 7. Suitable resistors 15, 16 and 17 are respectively connected in series with suitable electronic switches 18, 19 and 20, and these three series circuits are then connected in parallel with one another as shown. The switches 18, 19 and 20 are connected to the control unit 4 and controlled by the signal therefrom such that one of the switches is energized or closed in order that the compensating means 6 generates a signal which represents the condition where fuel is injected to all of the cylinders. An operational amplifier 22 is connected at its input terminal to a junction 21 and at its output terminal to a resistor 24. A feedback resistor 23 is connected across the operational amplifier 22. A capacitor 25 is connected between one terminal of the resistor 24 and the ground forming a smoothing circuit together with the resistor 24. A junction 26 between the resistor 24 and the capacitor 25 is connected to the transmission control unit 7.

In operation, when fuel is actually injected to all of the cylinders, a signal is fed to the switch 18 from the control unit 4 through a conducting line 10 to close the same with the switches 19 and 20 open, so that the signal from the throttle opening sensor 1 is applied through the resistor 15 and the switch 18 to the operational amplifier 22. As is well known, the amplification degree of the amplifier 22 is determined by the resistance ratio of the resistor 23 to resistor 15. Therefore, when the resistances of the resistors 15 and 23 are made equal to each other, the signal from the sensor 1 is tranferred unchanged in its magnitude to the transmission control unit 7.

On the other hand, when fuel is not injected to one of the cylinders, the signal from the control unit 4 is fed through line 11 to the switch 19 closing the same with the other switches 18 and 20 open. Therefore, the signal from the sensor 1 is fed to the operational amplifier 22 through the resistor 16 and the switch 19. In this case, the resistance ratio of the resistor 23 to resistor 16 is determined such that the magnitude of the signal fed to the unit 7 represents the condition where fuel is injected to all of the cylinders. Therefore, the transmission control unit 7 receives the signal the magnitude of which is equal to that of the first mentioned signal.

Whilst, when fuel is not injected to two cylinders, the signal from the control unit 4 is fed through line 12 to the switch 20 closing the same with the other switches 18 and 19 opened. As a result, the signal from the sensor 1 is fed to the operational amplifier 22 through the resistor 16 and the switch 20. In this case, like in the second mentioned one, the resistance ratio of the resistor 23 to resistor 17 is determined such that the magnitude of the signal fed to the unit 7 represents the condition where fuel is injected to all of the cylinders. Therefore, the transmission control unit 7 receives the signal the magnitude of which is equal to that of the first mentioned signal.

The integration circuit consisting of the resistor 24 and the capacitor 25 serves to smooth an abrupt change of the output signal from the amplifier 22 when the number of the fuel-injected cylinders changes. The provision of the integration circuit is preferable to precisely determine a proper shifting of gear ratios.

In the above, as aforementioned, the signal fed from the control unit 4 to the switches 18, 19 and 20 can be changed to represent the number of the cylinders to which fuel is actually injected.

It is apparent from the foregoing that, in accordance with the present invention, the fuel injection control system, which controls the number of the cylinders to which fuel is injected, properly operates together with a conventional electronic control type of automatic transmission system by merely providing the engine operating parameter changing unit or the compensating means 6. Thus, fuel economy can be achieved in comparison with the absence of the compensating means 6.

What is claimed is:

1. A fuel injection control system for use with an electronic type of automatic transmission system for an internal combustion engine of a vehicle, said electronic automatic transmission system including a transmission control unit for generating a signal representative of a proper shifting of gears, said fuel injection control system comprising in combination:

a plurality of injection means respectively provided at corresponding cylinders of the engine;

a first sensor for sensing the opening degree of a throttle to generate a signal representative thereof;

a second sensor for sensing vehicle velocity to generate a signal representative thereof, which second sensor is connected to said transmission control unit supplying the same with the signal;

a control unit connected to said first and said second sensor receiving the signals therefrom for determining the number of cylinders to which fuel is injected, and controlling said plurality of injection means connected thereto; and compensating means connected to said first sensor for receiving the signal therefrom and also connected to said control unit for receiving a signal representative of the number of the cylinders to which fuel is injected, and generating a signal representative of the opening degree of the throttle under the condition that fuel is injected to all of the cylinders, regardless of the number of the cylinders to which fuel is actually injected, said compensating means connected to said transmission control unit for supplying the same with the signal therefrom, whereby said transmission control unit determines the proper shifting of gear ratios based on the signals from said compensating means and said second sensor.

2. A fuel injection control system claimed in claim 1, in which said compensating means comprises:

an amplifier;

an input circuit connected between the input terminal of said amplifier and said first sensor and also connected to said control unit of said fuel injection control system, said input circuit changing the amplification degree of said amplifier in accordance with the signal from said control unit so that said amplifier generates the signal representative of the opening degree of the throttle under the condition that fuel is injected to all of the cylinders.

3. A fuel injection control system claimed in claim 2, in which said input circuit includes a plurality of series circuits which are connected in parallel with one another and each of which consists of an electronic switch and a resistor, the resistance of each of the resistors being different from one another and determined to properly change the amplification degree of said amplifier, and each of the electronic switches being controlled by the signal from said control unit to electrically connect one of the series circuits between the input terminal of said amplifier and said first sensor.

4. A fuel injection control system claimed in claim 2, in which said amplifier is an operational amplifier across of which a feedback resistor is connected.

5. A fuel injection control system claimed in claim 3, in which said compensating means further comprises a smoothing circuit including a resistor and a capacitor.

6. A fuel injection control system for use with an electronic type of automatic transmission system for an internal combustion engine of a vehicle, said electronic automatic transmission system including a transmission control unit for generating a signal repesentative of a proper shifting of gear ratios, said fuel injection control system comprising in combination:

a plurality of injection means respectively provided at corresponding cylinders of the engine;

a first sensor for sensing manifold absolute pressure to generate a signal representative thereof;

a second sensor for sensing vehicle velocity to generate a signal representative thereof, which second sensor is connected to said transmission control unit supplying the same with the signal;

a control unit connected to said first and said second sensor receiving the signals therefrom for determining the number of cylinders to which fuel is injected, and controlling said plurality of injection means connected thereto; and compensating means connected to said first sensor for receiving the signal therefrom and also connected to said control unit for receiving a signal representative of the number of the cylinders to which fuel is injected, and generating a signal representative of manifold absolute pressure under the condition that fuel is injected to all of the cylinders, regardless of the number of the cylinders to which fuel is actually injected, said compensating means connected to said transmission control unit for supplying the same with the signal therefrom, whereby said transmission control unit determines the proper shifting of gear ratios based on the signals from said compensating means and said second sensor.

7. A fuel injection control system claimed in claim 6, in which said compensating means comprises:

an amplifier;

an input circuit connected between the input terminal of said amplifier and said first sensor and also connected to said control unit of said fuel injection control system, said input circuit changing the amplification degree of said amplifier in accordance with the signal from said control unit so that said amplifier generates the signal representative of the manifold absolute pressure under the condition that fuel is injected to all of the cylinders.

8. A fuel injection control system claimed in claim 7, in which said input circuit includes a plurality of series circuits which are connected in parallel with one another and each of which consists of an electronic switch and a resistor, the resistance of each of the resistors being different from one another and determined to properly change the amplification degree of said amplifier, and each of the electronic switches being controlled by the signal from said control unit to electrically connect one of the series circuits etween the input terminal of said amplifier and said first sensor.

9. A fuel injection control system claimed in claim 7, in which said amplifier is an operational amplifier across of which a feedback resistor is connected.

10. A fuel injection control system claimed in claim 8, in which said compensating means further comprises a smoothing circuit including a resistor and a capacitor.

* * * * *